United States Patent
Becht

(10) Patent No.: US 6,548,807 B2
(45) Date of Patent: Apr. 15, 2003

(54) RADIATION RECEIVER WITH ACTIVE OPTICAL PROTECTION SYSTEM

(75) Inventor: Hubert Becht, Nürtingen (DE)

(73) Assignee: Zeiss Optronik GmbH, Oberkochen (DE)

( * ) Notice: Subject to any disclaimer, the term of this patent is extended or adjusted under 35 U.S.C. 154(b) by 0 days.

(21) Appl. No.: 10/028,391

(22) Filed: Dec. 22, 2001

(65) Prior Publication Data

US 2002/0121587 A1 Sep. 5, 2002

(30) Foreign Application Priority Data

Dec. 21, 2000 (DE) .......................... 100 63 824

(51) Int. Cl.$^7$ .............................. G01D 5/34; H01J 1/56; G01N 21/86; G01V 8/00; G01C 3/08
(52) U.S. Cl. .................. 250/229; 250/559.38; 356/4.01
(58) Field of Search ...................... 250/227.14, 214 R, 250/214 SW, 229, 559.38; 356/3.01, 5.15; 359/614, 230, 599, 227, 236

(56) References Cited

U.S. PATENT DOCUMENTS

| | | | | |
|---|---|---|---|---|
| 3,602,576 A | * | 8/1971 | Kohler et al. | 359/297 |
| 3,631,252 A | * | 12/1971 | Gebel | 250/214 VT |
| 4,288,158 A | | 9/1981 | Früngel | |
| 4,552,454 A | | 11/1985 | Glaser et al. | |
| 5,153,425 A | * | 10/1992 | Meinzer et al. | 250/216 |
| 5,319,434 A | * | 6/1994 | Croteau et al. | 356/28.5 |

FOREIGN PATENT DOCUMENTS

DE 43 25 139 C1 7/1993 ........... H01S/3/101

* cited by examiner

Primary Examiner—Thomas H. Tarcza
Assistant Examiner—Brian K Andrea

(57) ABSTRACT

Radiation receiver with a photodetector and a sensor, wherein the sensor receives the radiation intensity, and a shutter arranged before the photodetector is driven in dependence on the detected incident radiation intensity. The incident radiation is supplied to the photodetector via a delay device arranged before the shutter, so that no radiation destroying the photodetector can reach the photodetector, due to the shutter having been driven, and can if necessary be kept away or absorbed by the shutter.

11 Claims, 1 Drawing Sheet

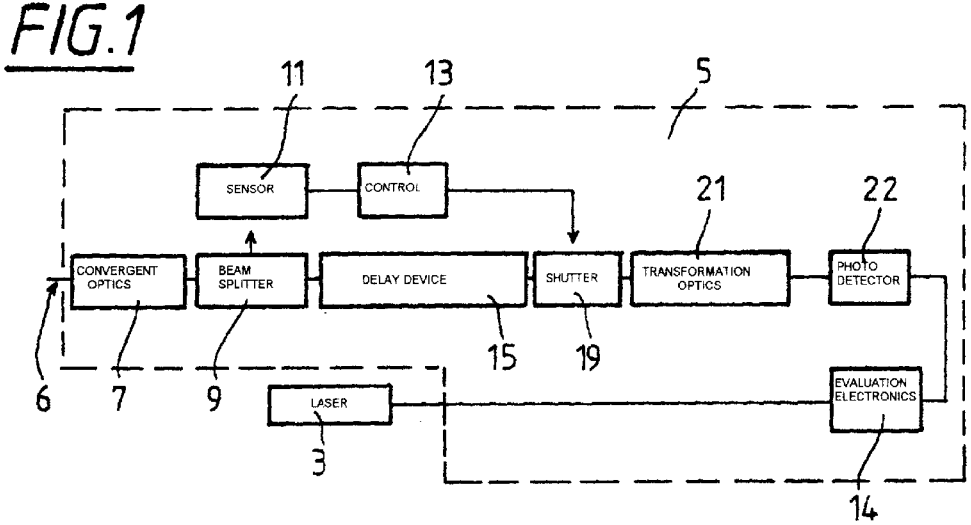
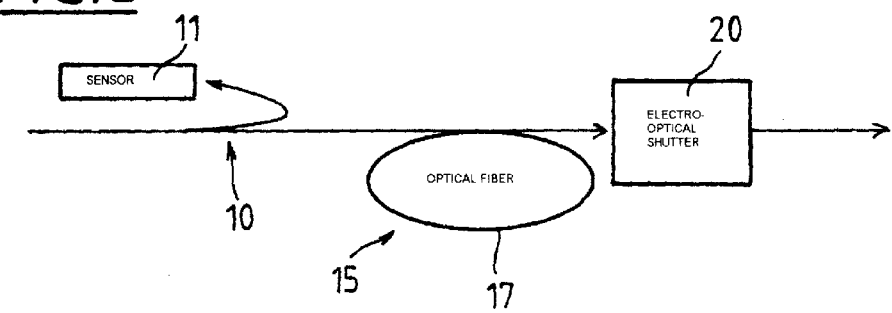
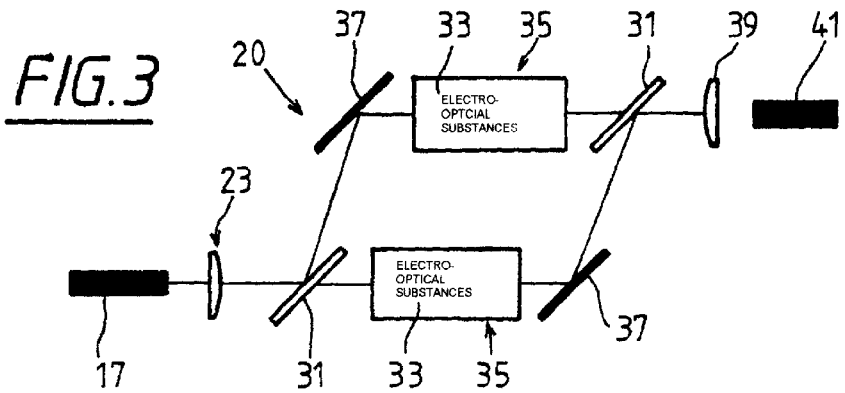

RADIATION RECEIVER WITH ACTIVE OPTICAL PROTECTION SYSTEM

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates to radiation receivers with a photodetector and a sensor, and also to a method of operating the same, and a rangefinder with such a radiation receiver.

TECHNICAL FIELD

A laser ceilometer with a device for reducing the radiation emitted by the laser ceilometer is known from U.S. Pat. No. 4,288,158. As soon as the direction of the laser ceilometer deviates by more than a predetermined angle from the vertical position, the angle being detected by a sensor, the radiation emitted by the laser ceilometer is reduced. It is thereby ensured that a radiation intensity emitted by the laser ceilometer and by which the human eye could be damaged is no longer emitted as soon as the direction of the laser ceilometer deviates from the vertical position by a predetermined amount whereby the possibility exists that the radiation of the laser ceilometer can enter the human eye.

A method is known from DE 43 25 139 C1 for preventing eye damage during the use of high power lasers. In this method, or with the apparatus known from this document, the radiation of a warning laser is superposed on the radiation of a high power laser. The radiation intensity of the warning laser is increased such that an observer's eyelid would be excited to close due to the radiation intensity emitted by the warning laser before a radiation intensity dangerous for the observer's eye is emitted by the high power laser.

A system and a method are known from U.S. Pat. No. 4,552,454, in particular for testing laser rangefinders. In this system for testing laser rangefinders, the radiation emitted by a transmitter is first coupled into a device with reflecting surfaces. The radiation is focused by this device on a ray input of a glass fiber, which is provided centrally and at the end with reflecting surfaces. The radiation is at least partially reflected at these reflecting surfaces and is conducted to a receiver by this system provided with reflecting surfaces. A calibration of the rangefinder can be carried out by means of this arrangement, based on the known path difference between the surfaces provided centrally in the fiber and at the end in the fiber.

Rangefinders are furthermore known which have a laser as the radiation source, the range being determined using the radiation reflected back. For this purpose, a radiation receiver is allocated for the back-reflected radiation.

Since the receiver of the present rangefinders has an extremely small surface, in order to attain a high detection sensitivity, problems of optical destruction occur more and more frequently in the present rangefinders. The receiver surface has a diameter of only just 70 μm in some cases. The receiving optics of such a rangefinder is designed so that the whole of the radiation within the visual field and striking the entrance aperture is collected onto the receiver. Thus even very low radiation powers or radiation densities in the entrance aperture can lead to an optical destruction of the detector. A particular danger arises, in particular, from the high peak pulse power, which can be in the megawatt range, emitted by the rangefinder. Reflections of the transmitted beam at back-reflecting targets situated near to the device, or at targets with a high retroreflected fraction, lead as a rule to destruction of the receiver.

Even the radiation produced in the device itself can lead to destruction of device components due to back-scattering under unfavorable conditions.

SUMMARY OF THE INVENTION

The invention has as its object to provide a radiation receiver and a method of operating the same so that a destruction of device components, particularly of the photodetector, by self-radiation and extraneous radiation is prevented.

A further object of the invention is to provide a radiation receiver or a rangefinder with a radiation receiver which is immediately available for measuring operation after a radiation input which is harmful to the radiation receiver.

The object of the invention is attained by a radiation receiver comprising a photodetector, a sensor, a shutter arranged before the photodetector, and a delay device arranged before the shutter. The sensor receives radiation intensity. The shutter is driven in dependence on detected incident radiation intensity. The incident radiation is supplied to the photodetector via the delay device. The object of the invention is also attained by the method for operating the radiation receiver.

By the measure of providing a delay device, it can be ensured that a shutter arranged before the radiation receiver is closed before the radiation incident on the radiation receiver can pass the shutter and reach the photodetector unhindered. A sensor is provided for the determination of the radiation intensity of the incident radiation, and is arranged such that as rapid as possible closing of the shutter can be attained.

It has been found to be advantageous for the determination of the radiation intensity to couple out a fraction, preferably less than 5%, of the incident radiation and to conduct it to the sensor. A beamsplitter has been found to be particularly advantageous for the coupling-out.

If the incident radiation is coupled into an optical fiber, particularly by means of a convergent optics, a fiber branch can be used for branching off a fraction of the radiation intensity. The use of optical fibers is advantageous because distortion due to objects intruding laterally into the beam path is prevented and it is easy to conduct the radiation on a non-linear path, thus giving space-saving advantages.

It has been found to be advantageous to provide an optical fiber as a delay device. In such optical fibers, radiation can be conducted with small losses. It is also possible to arrange an optical fiber in a curved shape without incurring considerable radiation losses. The radiation can thus be conducted in the optical fiber with small losses. The possibility of conducting the radiation on curved paths contributes greatly to the compactness of the radiation receiver.

It has been found to be advantageous to use a shutter, which has an electro-optical substance. Such electro-optical substances, such as e.g. liquids and particularly crystals, rapidly change their optical properties when an applied potential is changed and thus have an outstandingly short reaction time.

It has been found to be advantageous to provide a shutter, which includes a filter with variable absorption properties, or several filters with different absorption properties. It is thereby possible to damp the incident radiation in dependence on the detected radiation intensity by means of the shutter or by selection of the corresponding shutter, so that the radiation reaching the photodetector does not exceed the maximum permissible intensity. By feedback of information from the shutter to an evaluation electronics allocated to the photodetector, the degree of damping effected by the shutter can be taken into account by the evaluation of the obtained data. The range of use of the radiation receiver can thereby be considerably enlarged.

BRIEF DESCRIPTION OF THE DRAWINGS

The invention is described in detail hereinafter using an embodiment.

FIG. 1 shows a schematic diagram of a rangefinder with a radiation receiver;

FIG. 2 shows a schematic diagram of the method with a rangefinder, and

FIG. 3 shows a schematic diagram of an electro-optical shutter.

DETAILED DESCRIPTION OF THE INVENTION

The radiation receiver 5 shown schematically in FIG. 1 includes a convergent optics 7, by means of which the radiation of a radiation input 6 or of the entrance aperture is collected. An input beam is generated by this convergent optics 7. A portion of the radiation from this input beam is supplied to a sensor 11 by means of a beamsplitter 9 or by means of a fiber branch 10 as shown in FIG. 2. The signals of this sensor 11 are passed on to a control 13 by means of which the radiation intensity of the input beam is determined. If the value of the intensity of the input beam determined by the control 13 exceeds a predetermined value of a maximum permissible radiation intensity for the photodetector, a shutter 19 is driven to close. A reaction time between the radiation input with the sensing of the radiation intensity and the closing of the shutter 19 is given. To ensure that no damaging radiation intensity can reach the photodetector 22, the portion of the input beam which is not supplied to the sensor 11 is coupled into a delay device 15, here an optical fiber 17. At least a minimum time is required for the transmission by the optical fiber 17, and corresponds at least to the reaction time. Since the reaction time depends on how long the system requires to detect a high radiation intensity and close the shutter 19, the minimum time also depends on these parameters.

It can be provided that an absorber is pivoted in as a portion of the shutter, and due to it the radiation intensity is reduced to a permissible amount for the photodetector 22. It can also be provided that an absorber arranged in the beam path or before the photodetector 22 is first correspondingly activated, in dependence on the detected radiation intensity.

It can furthermore be provided to couple the radiation out of the radiation receiver 5, e.g. by means of a switchable mirror, before the radiation can reach the photodetector 22.

If the shutter 19 is opened, the light beam leaving the optical fiber 17 passes through the shutter 19 and is preferably supplied to the photodetector 22 via a transformation optics 21. The transformation optics 21 is optional, and it is also possible that the radiation passing through the shutter 19 falls directly on the photodetector 22. The signals generated by the photodetector 22 are supplied to an evaluation electronics 14. If the radiation receiver 5 is installed in a rangefinder device, a laser 3 is allocated to the radiation receiver 5 as a radiation source. It can be provided that this laser 3 is likewise driven by the control 13 which is a part of the evaluation electronics 14.

A method of protection of the radiation receiver 5, in particular of a range finder, is described using specific values in FIG. 2. The detailed values of power and destruction threshold are to be understood as values given by way of example, and are not limitative. An impression is to be given by these exemplary values of what an embodiment can look like and how far-reaching the associated protective function is.

An optical fiber is arranged behind the convergent optics at a place where the photodetector would otherwise be situated. In the embodiment example shown in FIG. 2, the sensor 11 is installed behind a fiber branch. The sensor 11 is exposed to 1% of the radiation input power through this fiber branch 10. It is however also possible to provide the sensor directly in the free beam path, particularly in the input region.

The remaining radiation power of 99% of the input beam passes via the long optical fiber 17, which functions as a delay device 15, to an electro-optical shutter 20. This electro-optical shutter 20 is described using FIG. 3. The photodetector (no longer shown) of the rangefinder is situated behind the electro-optical shutter 20.

The following data are used hereinafter as a basis:

Transmitter pulse duration: 3 ns

Energy of the transmitter laser pulse: about 20 mJ

Destruction threshold of the fiber material: 1.5 GW/cm$^2$

Destruction threshold of the electro-optical shutter: 100 MW/cm$^2$

Destruction threshold of the receiver: 500 watt peak pulse power

Switching time or delay time (delay between the onset of radiation intensity above the permissible peak pulse power and the closing of the electro-optical shutter): 50 ns Peak pulse power of the transmitting laser about 7 MW For a good signal transmission a step index fiber is used as the entrance fiber. The fiber cross section is dimensioned such that the full transmitted pulse power should fall on the fiber without causing any destruction.

From the destruction threshold of the fiber material and the transmitted pulse power, there is obtained from $$I_{max} = \frac{P_{max}}{0.25 * \Pi * d^2} \Rightarrow d = \sqrt{\frac{4 \times P_{max}}{I_{max} \times \Pi}}$$

transmitter pulse power, $I_{max}$ being the peak pulse power of the transmitting laser and $P_{max}$ being the destruction threshold of the fiber material. In the determination of 770 μm, it is assumed that the optical power is uniformly distributed over the fiber.

Such fibers are obtainable as state of the art components on the market. The permissible bending radii are about 30 cm, specific to the producer. Bending radii below 10 cm with long-term stability can be obtained by tempering.

The nominal bandwidth of such step index fibers is usually about 10 MHz/km. The fiber loss is about 0.008 dB/m. The refractive index n of the quartz core at 1575 nm is about n≈1.44. The numerical aperture is about 0.22.

To ensure a delay time of $\Delta t \approx 50$ ns, the length of the fiber delay line must be about l=10 m. The following holds:

$$C_h = \frac{c}{n}$$

with c=speed of light=$3 \times 10^8$ m/sec
h=refractive index of the fiber material=1.44

With the fiber data from our embodiment example, there is obtained $$BW_{Fiber}(l) = \frac{BW_{Fiber}}{l_{Fiber}}$$

$$\Delta \tau = \frac{0.3 - 0.5}{BW}$$

a pulse broadening of about 0.5 ns over the path of 10 m, $BW_{Fiber}$ being the bandwidth and $l_{fiber}$ being the length of the fiber in Km. The signal is scarely effected by the delay device or the optical fiber, because of the short length of the fiber in km.

The fiber branch is designed so that 1% of the input radiation is conducted to the sensor. The sensor 11 then has to respond to a power of 5 W. Such sensors which react to such a high response threshold, are obtainable at a favorable cost as standard components. For example, a very fast photodiode with a small active surface and a pulse rise time <0.5 ns is used.

The response threshold of the sensor 11 is converted with a comparator into a digital trigger signal for the electro-optical shutter. In such an arrangement, the reaction time conditioned by the sensor 11 is a few ns.

The electro-optical shutter shown in FIG. 3 blocks the signal to the photodetector on receiving the trigger signal of the sensor 11.

With the destruction threshold of the electro-optical shutter of 1/15 the destruction threshold of the fiber, the beam leaving the fiber has to be expanded to a beam having a beam diameter greater by a factor of 4. Then:

$$\frac{P_{max}}{P_{maxShutter}} = \frac{1.5 \text{ GW}}{100 \text{ MW}} = \frac{r^2}{(0.5 \times 770 \text{ nm})^2} \Rightarrow r \approx 1.52 \text{ mm}$$

As electro-optical substances or electro-optical crystals, two lithium niobate crystals, each with 3.1 mm free aperture, can for example, be used.

The permissible transmission with the shutter blocked is to be $T_{Shutter} < 0.7 \times 10^{-4}$, so that the destruction threshold of the photodetector is not attained by the radiation passing through the shutter.

$$P_{MAx,Sensor} \geq T_{Shutter} \times P_{max}; \; T_{Shutter} < \frac{500 \text{ Watt}}{7 \, M\text{Watt}}$$

The transmission with the electro-optical shutter opened can be in the region of T>80%.

The electro-optical crystals can be constructed such that the electro-optical shutter is completely closed without the application of an electrical field to the crystals. When the rangefinder is set in operation, an electrical field is applied to the crystals so that a 90° rotation of polarization is attained, and the electro-optical shutter becomes fully transparent. On receiving a trigger signal from the sensor 11, the field electrodes are grounded and, after the threatening light power has disappeared, are adjusted up again to the nominal potential.

The switching process is associated only with a slight charge reversal, and on average practically no power is thus required for it; the high voltage supply and switching can be very greatly miniaturized. Switching times in the region of only a few ns can be attained at tolerable cost. After the threatening light power has disappeared, the electro-optical shutter can be completely opened again after a few tens of ns.

The radiation receiver described in this embodiment and the presented method, with the components listed hereinbelow, should offer a reliable protection of the receiver of a laser rangefinder for peak pulse power irradiated into the receiver pupil of up to 7 megawatts. The protection function is configured as a fully autonomic unit and requires minimal internal electronic circuit cost.

Ideally, the whole optics and electronics, including the warning receiver, can be integrated in a hermetically closed housing of about matchbox size. Only the fiber delay lead would have to be placed externally. The components used in this embodiment are:

Step index optical fiber 17, about 770 $\mu$ core diameter, about 10 m long.
PIN photodiode with comparator for the sensor 11.
Spliced-on fiber branch 10 to the sensor 11.
Fiber collimator 23 and fiber coupling-in 39.
Two through four thin film polarizers 31.
Two deflecting mirrors 37.
Two electro-optical crystals 35 or electro-optical substances 33 for the Pockel effect, with about 3 mm diameter.
A fiber 41 connected to a photodetector.
High voltage supply and switch for the electro-optical crystals 35.
Miniaturized housing for the integration of all the components without the fiber delay lead.

| List of Reference Numerals: | |
| --- | --- |
| 1 | rangefinder device |
| 3 | radiation source/laser |
| 5 | radiation receiver |
| 6 | radiation inlet/inlet aperture |
| 7 | convergent optics |
| 9 | beamsplitter |
| 10 | fiber branch |
| 11 | sensor |
| 13 | control |
| 14 | evaluation electronics |
| 15 | delay device |
| 17 | optical fiber |
| 19 | shutter |
| 20 | electro-optical shutter |
| 21 | transformation optics |
| 22 | photodetector |
| 23 | collimator |
| 31 | polarizer |
| 33 | optically active substance |
| 35 | electro-optical crystal |
| 37 | deflecting mirror |
| 39 | fiber coupling-in optics |
| 41 | photodetector or optical fiber |

What is claimed is:
1. A radiation receiver comprising:
a photodetector,
a sensor, a shutter arranged before the photodetector, and a delay device arranged before the shutter, wherein the sensor receives radiation intensity, the shutter being driven in dependence on detected incident radiation intensity, and the incident radiation being supplied to the photodetector via the delay device.

2. The radiation receiver according to claim 1, wherein the delay device comprises an optical fiber.

3. The radiation receiver according to claim 1, further comprising a beamsplitter wherein a fraction of the incident radiation is supplied to the sensor via the beamsplitter.

4. The radiation receiver according to claim 3, wherein the fraction of incident radiation supplied to the sensor is less than 5%.

5. The radiation receiver according to claim 1, further comprising a convergent optics for focusing the incident radiation.

6. The radiation receiver according to claim 1, wherein the shutter comprises at least one radiation-absorbing filter.

7. The radiation receiver according to claim 6, wherein the shutter comprises a plurality of filters having different absorption properties.

8. A method for operating a radiation receiver, comprising the steps of:

using a radiation receiver according to claim 6, and providing an electro-optical substance as a filter.

9. A range finder comprising:

a radiation receiver according claim 1, and a laser as a radiation source.

10. A method of operating a radiation receiver, according to claim 1, comprising the steps of:

detecting incident radiation intensity via a sensor, driving the shutter arranged before the photodetector by a control device to close the shutter when a predetermined threshold value is exceeded;

coupling the incident radiation into a delay device, to exit the delay device after a predetermined minimum time and reach the photodetector after passing through the shutter.

11. The method according to claim 10, further comprising the steps of selecting a filter, and positioning the filter in the beam path, in dependence on a fraction of the incident radiation intensity sensed by the sensor.

* * * * *